United States Patent

Pratt

[15] 3,635,362
[45] Jan. 18, 1972

[54] TRUCK TO RAILCAR TRANSFER DEVICE AND METHOD

[72] Inventor: Robert A. Pratt, Harbert, Mich.
[73] Assignee: Clark Equipment Company
[22] Filed: July 30, 1969
[21] Appl. No.: 846,066

[52] U.S. Cl. .................. 214/38 A, 105/366 R, 105/366 A, 280/34 A
[51] Int. Cl. ............................................................ B61d 3/16
[58] Field of Search ............ 214/38 A; 280/34 A; 105/366 R, 105/366 A

[56] References Cited

UNITED STATES PATENTS

| | | | |
|---|---|---|---|
| 3,095,987 | 7/1963 | Sable | 214/38 A |
| 3,002,636 | 10/1961 | Felburn | 214/38 A |

Primary Examiner—Robert G. Sheridan
Attorney—Hobbs & Green and Kemon, Palmer and Estabrook

[57] ABSTRACT

Transfer of a load container from a truck to a railcar using a loading bolster to support and to swing the container into longitudinal alignment on the railcar during projection of the container onto the loading bolster by relative sliding movement between the container and the supporting surfaces of the truck, with transfer assisted by forward and reverse movements of the truck in directions transversely of the railcar.

5 Claims, 9 Drawing Figures

PATENTED JAN 18 1972

INVENTOR
ROBERT A. PRATT
BY *Hobbs & Green*

ATTORNEYS

INVENTOR
ROBERT A. PRATT
BY Hobbs & Green
ATTORNEYS

INVENTOR
ROBERT A. PRATT
BY Hobbs & Green
ATTORNEYS

INVENTOR
ROBERT A. PRATT
BY Hobbs & Green
ATTORNEYS 3,635,362

TRUCK TO RAILCAR TRANSFER DEVICE AND METHOD

BACKGROUND OF THE INVENTION

The use of combination truck and railroad transportation, where a part of the route of a given shipment may be by truck and another portion by rail, has increased the importance of satisfactory means of transfer load containers from a truck onto a railcar. In some cases the entire trailer of a truck-trailer combination has been transferred and this in itself is a rather difficult project. The increased use of relatively large containers in freight shipments makes it of importance that such large containers which might be as large as the load carrying portion of a truck-trailer be made capable of transfer on and off this trailer and particularly it would be important to facilitate the transfer of such containers onto a railcar with a minimum of equipment and in a short time.

SUMMARY

It is a primary object of the invention to provide a load transfer device for the unloading of a container from a truck onto a railcar using a telescoping chassis on the truck which on reverse movement of the truck projects the rear of the load container onto a pivoted loading bolster positioned on the railcar into position to complete alignment on the railcar.

It is a further object to provide means which after initial positioning of the container on the loading bolster that on subsequent rearward movement of the truck the load container is moved further onto the bolster and on activation of a pivot connection between the truck and the container, the container is moved further onto the bolster with the bolster and the container rotated on a pivot relative to the railcar and is swung toward longitudinal carrying position on the railcar.

It is another object to complete transfer of the load container to a railcar which includes the provision of at least one pivotal connection between the truck and the container which with the pivotal mounting of the loading bolster on the railcar will provide sufficient relative movement to continue to swing the load container into alignment in storage position on the railcar on backing the truck in generally jackknifed relationship with its trailer.

It is another object to provide a method for transfer of a load container from a truck to a railcar by projecting the container onto a centrally pivoted support on the railcar by relative sliding movements between the container and the truck, and to complete positioning of the container on the railcar by pivoted rotation of the container in a direction toward longitudinally aligned support position on the railcar.

The above and other objects of the invention will appear more fully from the following more detailed description and by reference to the accompanying drawings.

DRAWINGS

DESCRIPTIONS OF ILLUSTRATIVE STRUCTURES

Figure 1:
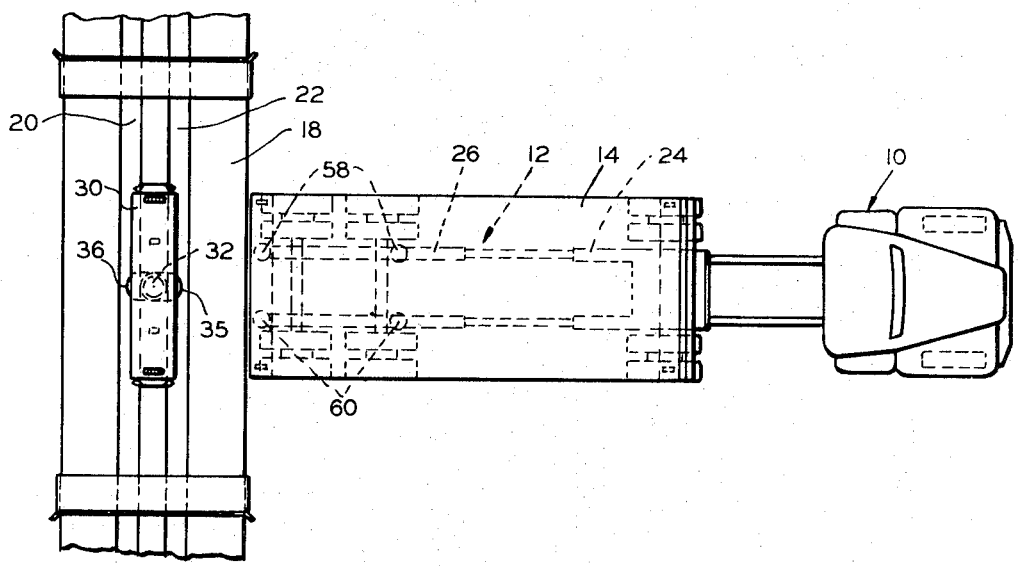
FIG. 1 is a top view of a truck-trailer assembly with load container secured thereon with provision for sliding movement between the supporting surfaces of the trailer and the undersurface of the container, the truck being shown in position with its rear in near abutting contact with the side of a railcar.
Figure 2:
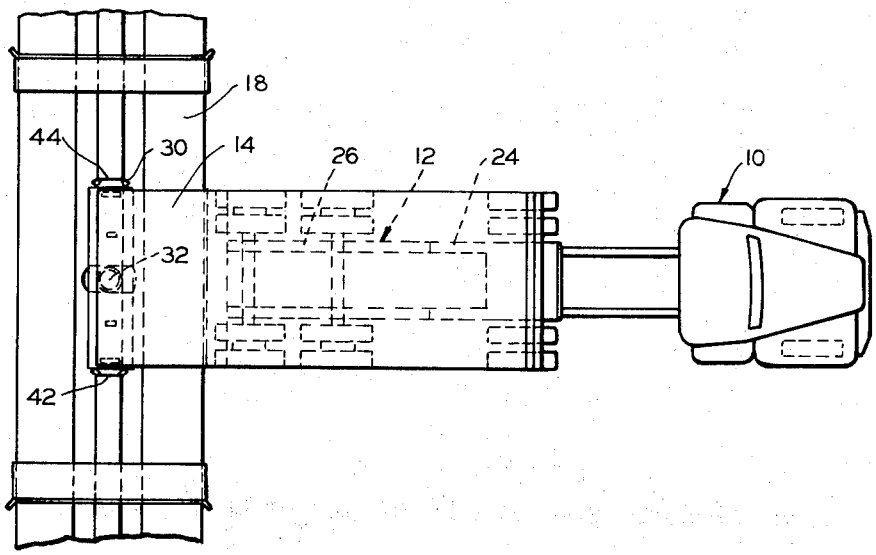
FIG. 2 is also a top view but with the load container projected onto the railcar with its projecting end supported on a loading bolster carried on the railcar.
Figure 5:
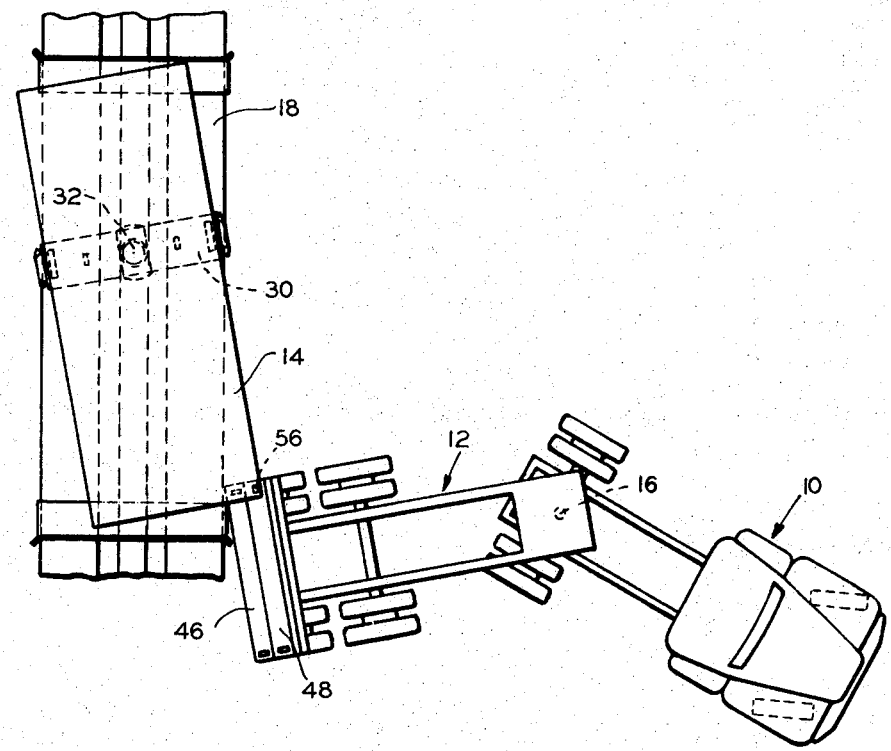
FIG. 5 is a top view showing the container supported on the loading bolster and swung into near alignment with the railcar with the truck and trailer still in connected relationship with the container.
Figure 6:
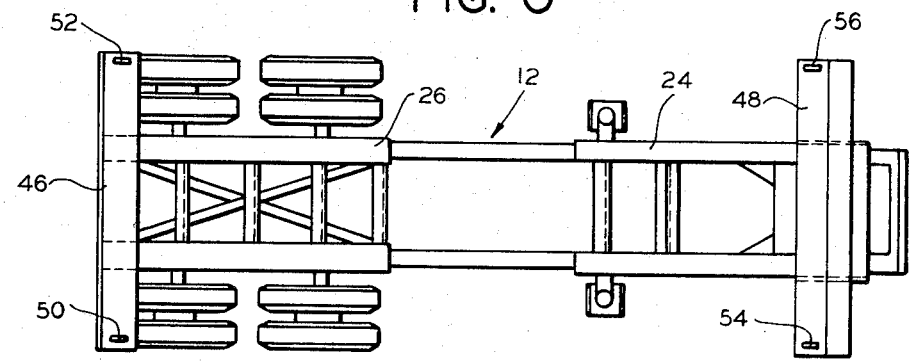
FIG. 6 is a top view of the trailer portion of a truck and trailer assembly and includes the showing of the telescoping portions of the trailer chassis.
Figure 7:
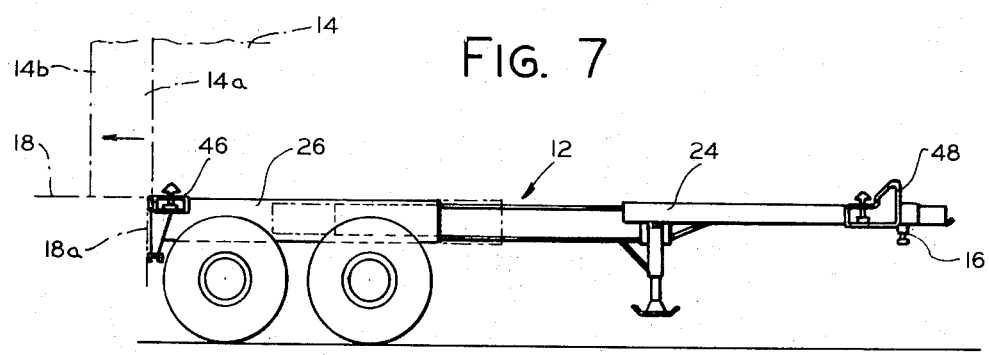
FIG. 7 is a side view of the trailer assembly shown in FIG. 1 and includes a dotted showing of the projection of the container accomplished on telescoping of the rear portion of the trailer forward relative to the front portion thereof.

Referring to the drawings a truck 10 (see FIG. 1, 6 and 7) has a trailer 12 on which is carried a load container 14. The trailer 12 is pivotally connected to the truck 10 (see FIGS. 3, 4 and 5) by a so-called fifth wheel pivot connection 16, the pivot itself being shown in the side view of the trailer in FIG. 7. This fifth wheel connection is conventional on so-called truck-trailer units. As shown in FIG. 1, the truck 10 with the trailer 12 attached with the container 14 thereon is shown backed in position with its rear against the side of a railroad car 18. The railcar 18 is preferably of a so-called flat car type with spaced center sills 20 and 22 extending longitudinally of the railcar. The trailer 12, as shown in FIG. 6 and 7, is made with a front portion 24 and a rear portion 26 constructed in telescoping relationship so that, as viewed in FIG. 7, the rear portion 26 from its normal extended position may be telescoped forward relative to the front portion 24. The dotted showing of the trailer 12 in FIGS. 1 and 2 indicates in FIG. 1 the extended position of the front and rear portions as shown in FIG. 7 while FIG. 2 shows the rear portion telescoped forward toward the front portion 24, that is, in its telescoped position the rear portion 26, with its wheels, moving forward relative to the front portion 24. Considering the FIGS. 1 and 2, the condition before telescoping is shown in FIG. 1, the rear of the trailer portion 26 being shown in near abutment relation with the side of the railcar 18 and on reverse drive of the truck 10 the rear portion 26 of the trailer 12 abuts against the side of the railcar and the rear of the load container 14 (see dotted lines in FIG. 7) has its undersurface in general alignment relative to the top surface of the railcar 18 (see dotted lines also in FIG. 7). Therefore, as the rear of the trailer 26 abuts against the railcar at 18a, (FIG. 7) the result will be a telescoping of the rear portion 26 of the trailer toward the front portion 24 and the container will move rearward, with the truck movement, to extend over the railcar to the position shown in FIG. 2. (See dotted lines 14a to 14b in FIG. 7 indicating initial movement).

Figure 8:
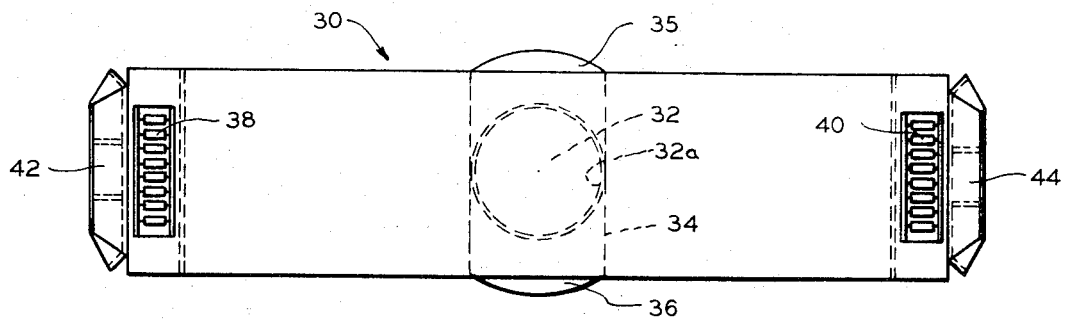
FIG. 8 is a top view of the pivoted loading bolster provided for assembly on the railcar.
Figure 9:
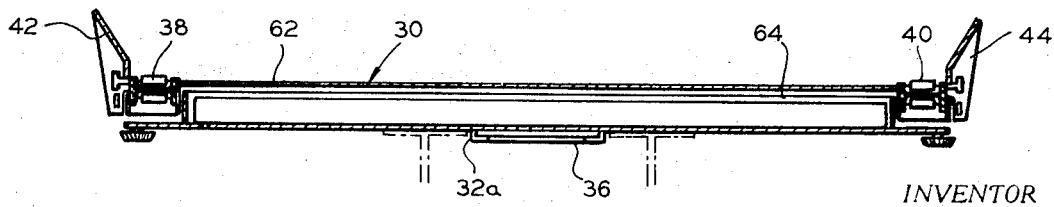
FIG. 9 is a side view of the loading bolster shown in FIG. 8.

Referring to FIGS. 1, 8 and 9 a loading bolster 30 is mounted for horizontal swinging movement relative to a center pivot 32, support member 34 being provided with extending portions 35, 36 of a form such that they will secure the bolster pivot 32 centrally between the two railcar sills 20 and 22 as shown in FIG. 1, the members 34, 36 extending under the sills with the result that the pivot 32 is thereby supported in such manner as to afford a swinging pivotal movement of the loading bolster 30 on pivot 32. The pivot 32 may be accomplished by means of a bearing 32a as shown in FIG. 8. As shown in FIGS. 8 and 9 the bolster has roller assemblies 38, 40 positioned adjacent each end and also guide plates 42, 44 adjacent the roller assemblies as shown so that the bolster 30 may be pivotally mounted to swing on the center pivot 32.

The structure of the loading bolster 30 as shown provides a centrally pivoted member with portions extending laterally outward from the pivot to provide a supporting surface substantially the width of the container so that when the container is pushed onto this pivotally supported member and reaches a position so that the bolster is in substantially the center of the container, the container will be supported on the railcar for swinging movement about an axis perpendicular to the surface of the car so that the container so supported can be swung to position substantially in longitudinal alignment with the car.

The structure of the loading bolster above set forth and as disclosed in the drawings is capable of receiving the container 14 as it is projected rearward over the railcar as shown by the change in position between FIGS. 1 and 2. In FIG. 2 it is noted that the container 14 has been put in a position such that it is supported between guide plates 42, 44 of the bolster (see also FIG. 8 and 9) and its sliding movement relative to the bolster is assisted by the roller assemblies 38, 40 (FIG. 8) so that a movement of the bottom of the container 14 relative to the bolster is assisted by the rollers.

It also be noted in FIGS. 6 and 7 that the trailer chassis frame is provided with a rear bolster 46 and a front bolster 48 on the right and left ends of rear bolster 46 twist locks 50 and 52 are provided respectively and on the right and left ends of front bolster 48 twist locks 54 and 56 are provided. Also the front bolster 48 is capable of sliding rearward into position against the rear bolster 46.

The load container 14 is mounted for sliding movement relative to the supporting surfaces of the front and rear trailer portions 24 and 26, i.e., the undersurface of the container 14 is capable of sliding relative to the supporting surfaces 24, 26 of the trailer.

Figure 4:
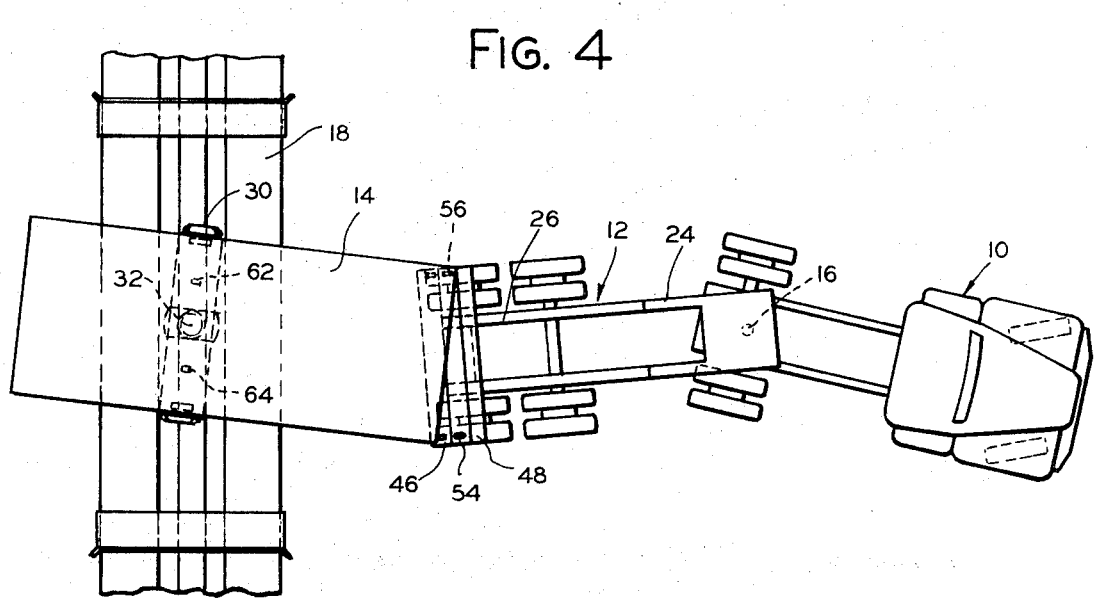
FIG. 4 is a top view with the container projected further onto the loading bolster and with the pivot connection between the container and the rear of the trailer in operation.

The twist locks are of such construction that they may be retracted or extended to secure the corners of the container in position relative to the bolsters. When the container 14 is in the position as shown in FIG. 1, which is the normal road driving condition, all the twist locks are projected to hold the container in position with each of its corners in a general relationship of the bolster position shown in FIG. 6. The retractable twist locks are also of the construction so that if one of them, such as the right-hand twist lock 56 on the bolster 48, is projected to connect, that a pivot will be provided by this connection if the other twist locks are retracted. In FIGS. 4 and 5 the front sliding bolster 48 is slid to the rear position so that the pivot is accomplished by the twist lock 56 which is the right-hand twist lock thereby providing both a support and a pivot at the front corner of the container relative to the sliding bolster 48 and the rear of the truck trailer which is at such a location adjacent the rear of the trailer 12.

Figure 3:
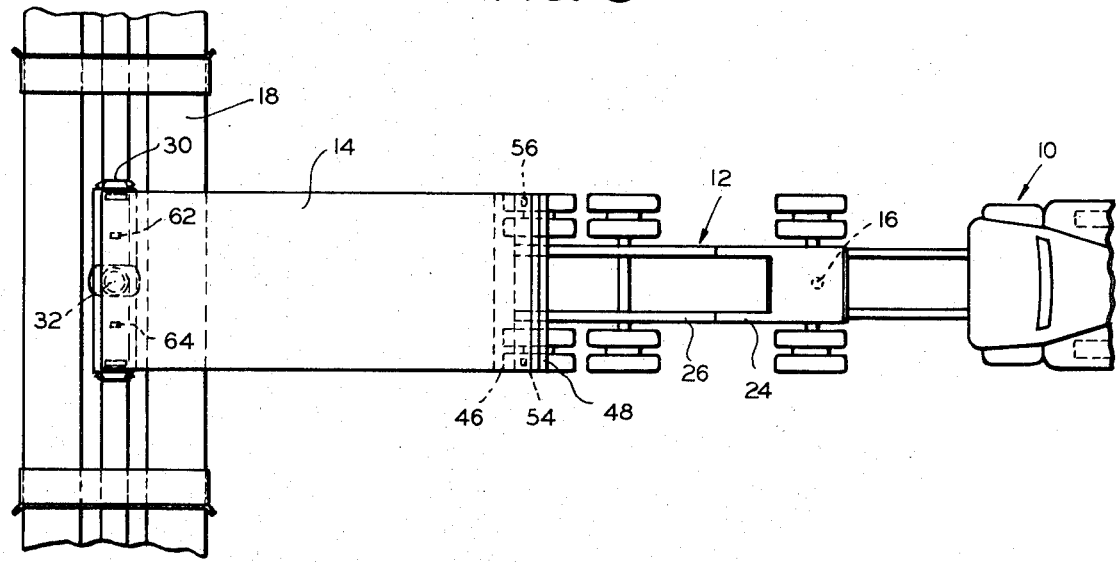
FIG. 3 is a top view of the truck, trailer, load container, and railcar showing the relative position of the container and other components when the trailer has been slid forward under the container.

Considering the operation of this device, it has been previously mentioned that the position in FIG. 1 is the initial position with the rear of the trailer and the container 14 then in its normal road driving condition backed with the rear end near abutment with the side of the railcar 18. From the position in FIG. 1 the container is projected over the railcar to the position of FIG. 2 by the reverse drive of the truck which abuts the rear of the telescoping rear portion 26 (see also dotted showing in FIG. 7) of the trailer 12 against the surface 18a of the railcar and this rearward movement as shown by the dotted lines 14a and 14b of FIG. 7 causes the container to be projected over the surface of the railcar 18 while at the same time the rear chassis portion 26, while it is really stationary, is telescoped relative to the front portion 24 of the trailer, which with the container 14 moves rearwardly. The relative movement of the rear portion 26 which remains stationary against the railcar is moved forward relative to the front trailer portion 24. Thus the assembly of container 14 and the forward portion 24 of the trailer are moved rearward by the reverse drive of the truck and the container projects over the railcar. The distance of initial rearward movement is shown in FIG. 2 where the rear end of container 14 rests on the loading bolster 30 and it is also noted that as shown in FIG. 1 air suspension devices 58, 60 are provided to lift the trailer supporting members so that the container may be positioned vertically to align with the supporting surface of the loading bolster 30. That is, the container 14 with its undersurface will be positioned relative to the bolster so that it will project over the bolster for support thereon. It is also noted that the twist locks 50, 52 are retracted from the rear of the container to allow the rear chassis portion 26 to move forward relative to the front portion 24. Or to state it in another way—the rear chassis portion 26 remains stationary and relative to the railcar the entire truck and trailer assembly, except the rear chassis portion is moved rearward on the reverse drive of the truck. Referring to FIG. 3 it is the next step to pull the truck-trailer chassis forward with its rear portion 26 telescoped after engaging the container sill locks 62, 64 to fix the rear of the container 14 on the loading bolster 30. The truck-trailer chassis in its telescoped position as shown in FIG. 2 is moved forward by the forward drive of the truck under the container 14 to the position as shown in FIG. 3. In this movement the front bolster is released and the front bolster 48 is moved to the rear bolster 46 by pulling the telescoped trailer members 24, 26 forward to the position shown in FIG. 3.

At this time the twist locks 54, 56 of the front bolster are engaged and in order to prepare for the next step, the right-hand sill lock 54 is released leaving the left twist lock 56 engaged, to form a pivot, and the locks 62, 64 on the loading bolster are released and the truck put in partial jackknifed position as shown in FIG. 4. With the truck in reverse drive as shown in FIG. 4 it will push the container 14 further over the loading bolster 30 and at the same time, because of the partial jackknifed relationship of the truck and trailer, and the pivot at 56, will turn the loading bolster about pivot 32 with the container 14 thereon in a clockwise direction as shown in FIG. 4. It is noted that the change in position between FIGS. 3 and 4 that the container results in a further projection of the container over the railcar and at the same time the bolster 30 with the container thereon rotates about the center pivot 32 of the loading bolster. Also the left-hand twist lock 56 provides a pivot in order that the front of the container may move relative to the truck-trailer chassis into the position shown in FIG. 4. It is also noted that the fifth wheel pivot 16 also allows pivotal movement of the trailer relative to the truck and it is the result of the reverse drive movement that all three of the pivots 32, 56 and 16, together with the relative position of the truck-trailer because of the partial jackknifed relationship, all result in a movement of the container 14 and the rotation about the pivot 32 as shown in FIG. 4.

Considering the position as shown in FIG. 5 it should be noted that this position is merely a further movement with the same pivots and connections as shown in FIG. 4 but it is the result of further rearward movement of the truck in the jackknifed position. In the position shown in FIG. 5 the loading bolster has rotated clockwise about the pivot 32 to bring the container toward near alignment with the longitudinal support position for its final location on the railcar. It is noted also that in FIG. 5 the left-hand twist lock 56 can be released and, if necessary, the truck driven away. It is then possible to swing or push the container into aligned position on the railcar from the position shown in FIG. 5. This movement would be possible because by its pivotal support the rail car would be nearly balanced on the pivot 32.

In addition to the apparatus disclosure above the description of operation is particularly pertinent to a method of transfer of the load container between a truck and a railcar.

Referring to FIGS. 1, 2 and 3 the steps from the position shown in FIG. 1 include sliding the container 14 relative to the supporting surface of the truck with the rear of the truck abutting the railcar and with the truck in reverse drive thereby projecting the container over the surface of the railcar by a sliding movement between the undersurface of the container and the supporting surface of the truck. The rear of the container is thus positioned on the pivoting loading bolster 30 for pivotal movement centrally of the railcar and, after sliding the truck surfaces under the container as described, the container is further projected onto the rail car to a position substantially centrally on the railcar as shown in FIG. 4. The provision of the pivot 56 with the front of the container resting on the rear of the truck enables subsequent reverse drive of the truck to push the container further over the pivot and simultaneously to swing the container toward alignment on the railcar as shown by FIGS. 4 and 5.

The invention has been described by reference to a specific disclosure but it is expected that modification may be made within the scope of the following claims:

1. A load transfer device for unloading a container from a truck onto an adjacent railcar comprising:
   a loading bolster centrally pivoted for a swinging movement parallel to the surface of the railcar;
   laterally extending portions of said loading bolster forming a support substantially the width of the container;
   supporting surfaces on said truck;
   means supporting said container in sliding relationship relative to said supporting surfaces;
   a rearward portion of the truck mounted to move forward relative to the forward portion of the truck;
   means to position the truck and container so that the under surface of the container is aligned above the surface of the railcar when the truck is backed with its rear portion adjacent the side of the railcar;
   whereby on reverse drive of the truck the rear of the truck contacts the side of the railcar and the rear portion of said truck is held in position thereby and the remainder of the truck and the container moves rearward relative to the rear portion of the truck and the railcar so that the rear end of the container is projected to the center of the railcar for support on the pivoted loading bolster;
   pivot means between the front of the container and the rear of the truck;
   whereby on subsequent reverse drive of the truck the container slides further onto the bolster and at the same time the container and bolster rotate to position said container toward alignment longitudinally of the railcar.

2. A load transfer device as in claim 1 wherein means are provided to secure the container to the loading bolster;
   whereby on subsequent forward movement of the truck the truck supporting surfaces under the container are moved forward under the container so that the front of the container is positioned for support on the rearward portion of the truck.

3. A load transfer device for unloading a container from a truck onto an adjacent railcar comprising:
   a loading bolster centrally pivoted for a swinging movement parallel to the surface of the railcar;
   laterally extending portions of said loading bolster forming a support substantially the width of the container;
   supporting surfaces on said truck;
   means supporting said container in sliding relationship relative to said supporting surfaces;
   a rearward portion of the truck mounted to move forward relative to the forward portion of the truck;
   means to position the truck and container so that the under surface of the container is aligned above the surface of the railcar when the truck is backed with its rear portion adjacent the side of the railcar;
   whereby on reverse drive of the truck the rear of the truck contacts the side of the railcar and the rear portion of said truck is held in position thereby and the remainder of the truck and the container moves rearward relative to the rear portion of the truck and the railcar so that the rear end of the container is projected to the center of the rail car for support on the pivoted loading bolster;
   means are provided to secure the container to the loading bolster;
   whereby on subsequent forward movement of the truck, the truck supporting surfaces under the container are moved forward under the container so that the front of the container is positioned for support on the rearward portion of the truck;
   pivot means between the front of the container and the rear of the truck;
   whereby on subsequent reverse drive of the truck the container slides further onto the bolster and at the same time the container and bolster rotate to position said container toward alignment longitudinally of the railcar.

4. A load transfer device for transferring a load container from a truck;
   said truck being of the type employing a trailer with a fifth wheel pivoted connection securing the trailer to the truck;
   means mounting a load container on the trailer with the under surface of the container mounted for a sliding movement relative to the supporting surface of the trailer longitudinally thereof;
   a loading bolster formed to support the container;
   means to pivotally support said loading bolster centrally on the railcar on an axis perpendicular to the surface of the railcar;
   means to project the container in sliding movement relative to the trailer onto said loading bolster in position such that the bolster supports said container for pivotal movement with the under surface of the container substantially parallel with and above the surface of the railcar;
   pivot means are provided to pivot the forward end of the container relative to the trailer in addition to the pivotal support of the loading bolster on the railcar and in addition to the fifth wheel pivoted connection securing the trailer to the truck;
   said pivot between the forward end of the container and the trailer being positioned between the pivot of the bolster and the pivot of the fifth wheel connection;
   whereby on rearward movement of the truck in controlled jackknifed relationship afforded by the fifth wheel pivot the container is pushed farther onto the bolster and simultaneously the bolster is caused to rotate on its pivot with the container in a direction toward alignment of the container longitudinally with the railcar.

5. Load transfer device as in claim 4 wherein:
   means are provided to project said container further onto the bolster in position such that the bolster is located substantially centrally of the container and the container thereby mounted for pivotal swinging movement in a direction to align the container with the railcar for support thereon.

* * * * *